Feb. 10, 1925.

J. BRISTOW

OILER FOR CLUTCH COLLARS

Filed Dec. 18, 1922

INVENTOR
JOHN BRISTOW
By Edward E. Lingan
ATTY

Feb. 10, 1925.
J. BRISTOW
1,526,048
OILER FOR CLUTCH COLLARS
Filed Dec. 18, 1922
2 Sheets-Sheet 2
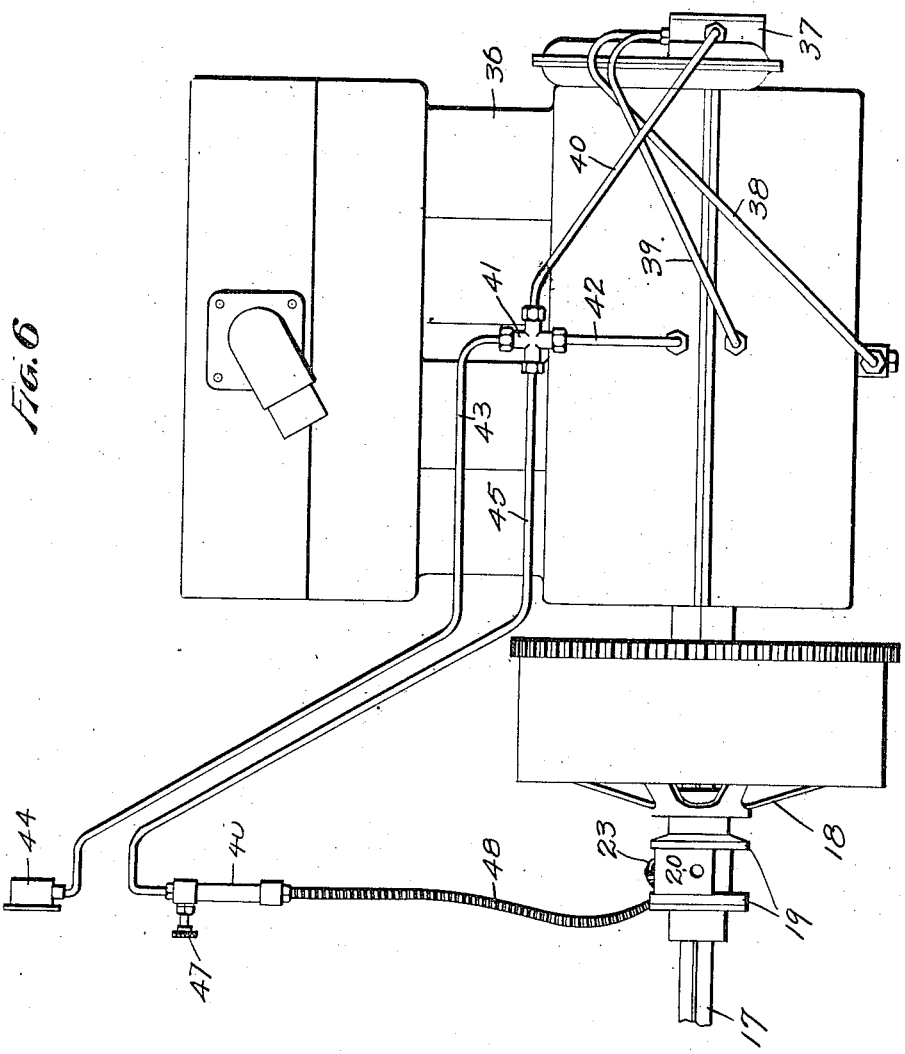
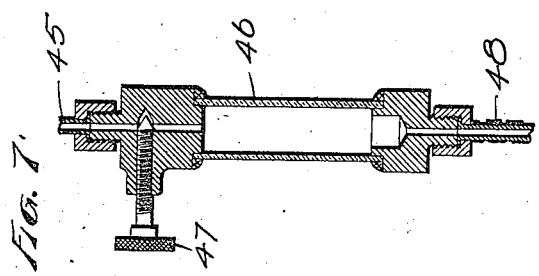
INVENTOR
JOHN BRISTOW
BY Edward E Lingan
ATTY.

Patented Feb. 10, 1925.

1,526,048

UNITED STATES PATENT OFFICE.

JOHN BRISTOW, OF ST. LOUIS, MISSOURI, ASSIGNOR OF THREE-FOURTHS TO CHARLES E. MENGEL, OF KIRKWOOD, MISSOURI.

OILER FOR CLUTCH COLLARS.

Application filed December 18, 1922. Serial No. 607,542.

To all whom it may concern:

Be it known that I, JOHN BRISTOW, a citizen of the United States, and resident of the city of St. Louis and State of Missouri, have invented certain new and useful Improvements in Oilers for Clutch Collars, of which the following is a specification, containing a full, clear, and exact description, reference being had to the accompanying drawings, forming a part hereof.

My invention relates to oilers for clutch collars and has for its primary object, an oiler whereby lubricant can be supplied to the clutch collar of an automobile without removing the floor boards and without crawling underneath the machine.

A further object is to construct an oiler for clutch collars which consists of an oil receptacle which has connected thereto a flexible tube, this tube leading to and being secured within the oil reservoir of a clutch collar in such a manner that the collar and clutch mechanism can freely operate without danger of breaking the flexible tube.

In the drawings:—

Fig. 6 is a side elevation of a modified form of oiler as used in connection with an oil pump and Fig. 7 is an enlarged vertical sectional view of the visible regulating means employed in Fig. 6.

Figure 1:
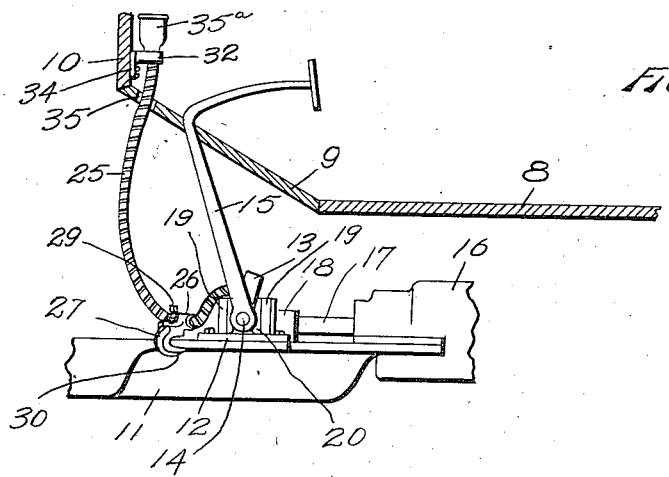
Fig. 1 is a fragmental view of a portion of an automobile, showing the clutch operating mechanism and also the floor, toe and dash boards, with my device applied thereto.

In carrying out my invention, 8 represents the floor board of an automobile, 9 the toe board, and 10 the dash, 11 represents a supporting frame which is secured to the engine supports or may if desired, form an integral part thereof; to this frame are secured brackets 12, between which brackets is secured a yoke 13, this yoke being secured to a shaft 14, to which the clutch pedal 15 is secured. Secured to the supporting frame 11 is a housing 16 in which the gears composing the transmission are mounted. Extending forward from the transmission housing 16 is a shaft 17 on which is slidably mounted the clutch member 18, this clutch member has spaced apart flanges 19 between which the clutch collar 20 is placed. This clutch collar is preferably U-shaped in form and is made hollow as indicated by the numeral 21, this hollow portion constituting an oil reservoir; the collar 20 is so constructed either with wicks or wooden plugs or with small openings as to permit the passage of oil from the reservoir 21 to the outside of the collar and thus prevent undue wear. The clutch collar 21 is provided on its top surface with an opening 22. The device thus far described is the standard construction of the aforementioned type of automobile.

In carrying out my improvement, I place within the opening 22 a pipe 23, this pipe having an offset portion 24 which is designed to contact with the under-surface of the top of the clutch collar, in other words, it lies within the oil reservoir 21; by this construction the pipe 23 is held within the reservoir and against any possibility of jolting out. Secured to the pipe 23 is one end of a flexible tube or oil conduit 25, this oil conduit is passed through a collar 26 which is formed integral with a hook 27, the hook 27 is provided with a screw threaded opening 28 on its upper portion through which a set screw 29 passes, this is for the purpose of securing the hook to the supporting frame 11. The lower portion 30 of the hook is provided with a cut-away portion 31, this cut-away portion is essential as some types of supporting frames are made U-shaped in cross section for part of the distance, as illustrated in Fig. 1; and this cut-away portion allows the hook to be placed in proper position. The upper end of the conduit 25 is secured within the lower portion of a sleeve 32, the upper portion of the sleeve 32 is provided with a screw threaded opening 33. The sleeve 32 is formed integral with a bracket 34, which bracket is designed to be secured either to the dash board 10 or to the instrument board of an automobile. Within the screw threaded opening is secured an oil container 35ª, this being for the purpose of receiving oil from an oil can and is provided with a lid, which may be either hinged thereon and held in closed position with a spring or may be screwed within the cup.

I may also use the screw threaded opening to secure the sight feed device used in Figs. 6 and 7 and which will be described in detail later.

The installation of the device thus far described is as follows:—

Figure 3:
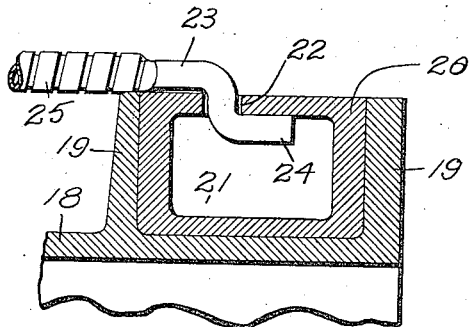
Fig. 3 is an enlarged vertical longitudinal fragmental section of the clutch collar, and a portion of the clutch showing the manner of securing the oil pipe therein.
Figure 2:
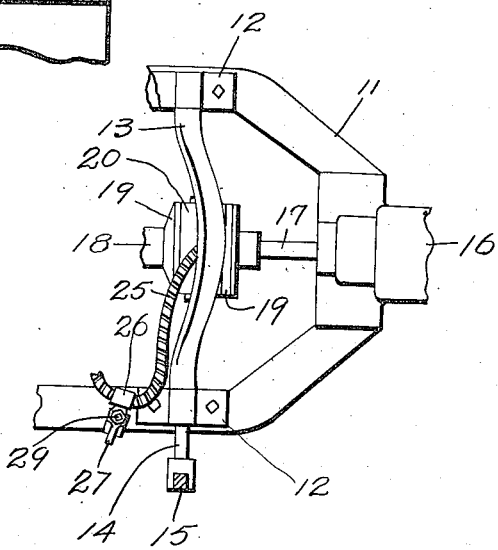
Fig. 2 is a fragmental top plan view of the clutch operating mechanism, showing the manner of securing the flexible tube or oil conduit to the supporting frame.
Figure 4:
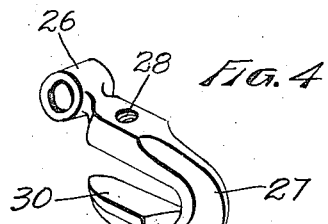
Fig. 4 is a perspective view of the clamp made use of for securing the oil conduit to the supporting frame.
Figure 5:
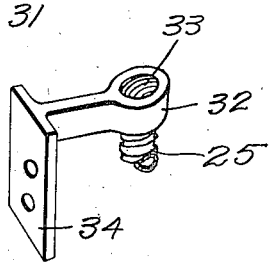
Fig. 5 is a perspective view of the bracket for supporting the upper end of the oil conduit and also the oil container.

The first step necessary is to make an opening 35 through the toe board 9, the end of the oil conduit 25 containing the pipe 23 is inserted through this opening, the pipe is next passed through the sleeve 26, which sleeve is of sufficient size to loosely encircle the conduit 25, after this the pipe 23 is inserted within the oil reservoir 21 through the opening 22 as illustrated in Fig. 3, and the hook 27 then secured to the supporting frame 11, this hook is designed to prevent undue vibration of the oil conduit 25, which would be the case were this hook not present, as the vibration and jolting of the machine over rough rouds would swing the conduit and place undue strain thereon.

In the modification 36 represents an automobile engine and 37 the oil pump, 38 represents the suction line and 39 and 40 delivery lines. Secured on the delivery line 40 is a cross 41 which has connected thereto an oil pipe 42, a pressure pipe 43 which leads to a gauge 44. The structure thus far described is common to all cars previously mentioned with the exception that instead of a cross 41, a T is used. Secured to the cross 41 is a pipe 45 which is connected to a sight feed gauge 46, which gauge is provided with a needle valve 47 so that the flow of oil can be regulated, the rate of flow being visible through the glass in the gauge; secured to the lower end of the gauge is a flexible oil conduit 48, this conduit is likewise provided with the pipe 23 for securing within the clutch collar and also with a hook 27, this hook serving the same purpose as before mentioned.

I have found that in oiling the clutch collar of the aforementioned type of machine, it is necessary to raise the floor board of the machine and then disengage the clutch so that access can be had to the oil opening 22 in the clutch collar. This is a very awkward procedure and frequently necessitates the employment of two persons, especially when the clutch spring is very stiff. It is also necessary to fill this oil reservoir at least every 250 miles and on account of the unhandiness of supplying oil in this place, the oiling has been very frequently neglected causing worn out clutch collars and considerable expense; by the use of my device this oiling can be readily done either by hand or by connecting it to the lubricating system of the engine, thus my device is not only a time saver, but more cleanly, as it is not necessary to reach in among greasy parts to accomplish the oiling, and furthermore, being easy to get at, the clutch collar will be properly oiled and consequently repair bills saved.

Having fully described my invention, what I claim is:—

1. A clutch collar oiler comprising a flexible oil conduit, an oil receptacle secured to one end thereof, and means carried by the opposite end of said conduit for securing the same to a clutch collar.

2. A clutch collar oiler comprising a flexible oil conduit, an oil receptacle secured to one end thereof, means for supporting said oil receptacle, and means for securing the conduit to a clutch collar.

3. A clutch collar oiler comprising a flexible oil conduit, an oil receptacle secured to one end thereof, means carried by the opposite end of said conduit for securing the same to a clutch collar, and means for securing said conduit intermediate its length for holding the same against vibration.

4. A clutch collar oiler comprising a flexible oil conduit, an oil receptacle secured to one end thereof, means for supporting said oil receptacle and conduit, means carried by the opposite end of said conduit for securing the same to a clutch collar, and means for securing said conduit intermediate its length against vibration.

5. A clutch collar oiler comprising a flexible oil conduit, a supporting means secured to one end thereof, an oil receptacle carried by said supporting means and communicating with said conduit, an offset pipe secured to the free end of said conduit for securing the same within a clutch collar.

6. A clutch collar oiler comprising in combination with a clutch collar having an oil hole, a flexible oil conduit, a bracket secured to one end of said conduit, an oil receptacle secured to said bracket and communicating with said conduit, an offset pipe secured to the opposite end of said conduit and adapted to be inserted through the oil hole in the clutch collar for securing the same thereto, and means for supporting said conduit intermediate its length whereby excessive vibration of said conduit is prevented.

7. A clutch collar oiler comprising in combination with a clutch collar having an oil reservoir and an oil hole, a flexible oil conduit provided on one end with means whereby the same is secured within the oil hole, an oil receptacle secured to the other end of said conduit, and means for supporting said oil receptacle and conduit without interfering with the movement of the clutch collar.

In testimony whereof, I have signed my name to this specification.

JOHN BRISTOW.